United States Patent
Hilerio

(10) Patent No.: US 7,103,379 B2
(45) Date of Patent: Sep. 5, 2006

(54) WEARABLE ELECTRONIC DEVICE

(75) Inventor: Israel Omar Hilerio, Versalles Calle Reina, PR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 339 days.

(21) Appl. No.: 10/357,234

(22) Filed: Feb. 3, 2003

(65) Prior Publication Data

US 2004/0176131 A1 Sep. 9, 2004

(51) Int. Cl.
*H04M 1/00* (2006.01)

(52) U.S. Cl. ............ 455/556.1; 455/517; 455/550.1

(58) Field of Classification Search ............ 455/556.1, 455/556.2, 557, 558, 566, 517, 550.1, 456.5 455/414.1, 425
See application file for complete search history.

(56) References Cited

U.S. PATENT DOCUMENTS

| | | | | |
|---|---|---|---|---|
| 4,869,004 A | * | 9/1989 | Maloney | 40/1.5 |
| 5,465,286 A | * | 11/1995 | Clare et al. | 379/32.04 |
| 6,009,333 A | * | 12/1999 | Chaco | 455/456.5 |
| 6,505,297 B1 | * | 1/2003 | Inamitsu et al. | 713/1 |
| 6,550,655 B1 | * | 4/2003 | Warner | 224/575 |
| 6,711,414 B1 | * | 3/2004 | Lightman et al. | 455/517 |
| 6,813,491 B1 | * | 11/2004 | McKinney | 455/414.1 |
| 6,850,754 B1 | * | 2/2005 | Nakano | 455/348 |
| 2001/0006902 A1 | * | 7/2001 | Ito | 455/558 |
| 2001/0053701 A1 | * | 12/2001 | Hattori | 455/550 |
| 2004/0204843 A1 | * | 10/2004 | Hayama et al. | 701/209 |

FOREIGN PATENT DOCUMENTS

GB    2378033 A   *   1/2003

* cited by examiner

*Primary Examiner*—CongVan Tran

(57) ABSTRACT

Disclosed is a wearable electronic device including a processing device, memory that stores organization data, a wireless receiver that receives organization data, and a display that displays organization information to a user, wherein the electronic device is substantially card-shaped.

36 Claims, 7 Drawing Sheets

WEARABLE ELECTRONIC DEVICE

BACKGROUND

Many organizer devices are now available on the market. For example, many personal digital assistants (PDAs) are available which can be used to store contacts data, calendar data, and the like. Several of these devices are configured to synchronize with a user computing device such as a personal computer (PC) so that data can be shared between the computing device and the organizer device. This way, information that is entered into either device can likewise be provided to the other.

Although organizer devices such as PDAs provide a relatively convenient way for accessing contact information and for keeping track of appointments, such devices are only useful if the user remembers to carry the device with him or her. For instance, if an alarm is set to activate to remind the user as to a meeting in which the user is to participate, sounding of the alarm is useless if the device is not within the vicinity of the user.

Even when the user remembers to bring the organizer device along with him or her, for example to meetings or other appointments, the user normally must carry the organizer device along with any other devices (e.g., mobile telephone, beeper, etc.) or other objects (e.g., books, papers, etc.) that the user needs. Even though most organizer devices are small compared to desktop and laptop computers, having to carry an organizer device is nevertheless inconvenient.

In view of the above, it can be appreciated that it would be desirable to have a device that provides organizer functionality but that the user is less likely to leave behind and that is convenient to carry.

SUMMARY

Disclosed is a wearable electronic device including a processing device, memory that stores organization data, a wireless receiver that receives organization data, and a display that displays organization information to a user, wherein the electronic device is substantially card-shaped.

BRIEF DESCRIPTION OF THE DRAWINGS

The disclosed identification badge can be better understood with reference to the following drawings. The components in the drawings are not necessarily to scale.

DETAILED DESCRIPTION

As noted above, it can be difficult to remember to bring an organizer device with an individual as he/she moves from place to place. Furthermore, it can be inconvenient to have to carry the organizer device even when one remembers to take the device along. Accordingly, needed is a device that can provide the functionality of an organizer device, but which is less likely to be left behind and more convenient to carry. As is described in greater detail below, such functionality can be integrated with an identification badge that is worn by a user in an office or other setting so that the organizer functionality is always available to the user and the need to physically carry a device is obviated. Such an identification badge can, optionally, be configured as a data review device. When configured in this manner, data can be provided to the identification badge through wireless synchronization with another device so that the organization data can be automatically downloaded to the badge and therefore taken along with the user.

As is illustrated in the following figures, disclosed are example systems, apparatus, and methods. Although specific embodiments are shown and described herein, these embodiments are provided by way of example only for purposes of describing the manners in which a user can be provided with organization information.

Figure 1:
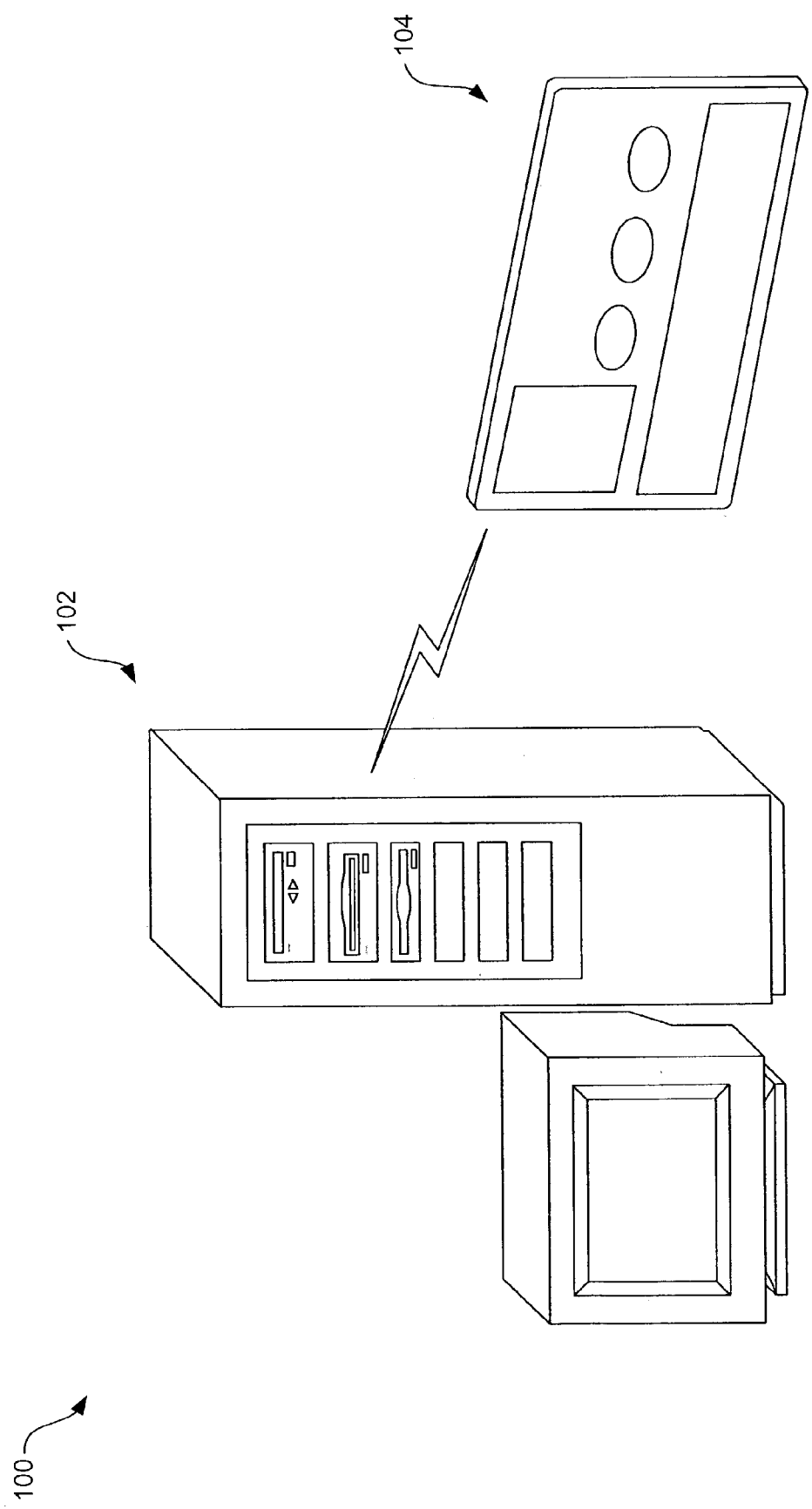
FIG. 1 is a schematic view of a system for providing organization information.

Referring now in more detail to the drawings, in which like numerals indicate corresponding parts throughout the several views, FIG. 1 illustrates a system 100 in which organization data may be stored and conveniently carried with the user. The system 100 includes a user computing device 102 and an identification badge 104. As illustrated in FIG. 1, the user computing device 102 can comprise a desktop computing device such as a personal computer (PC) or a Macintosh computer. Alternative arrangements not shown in FIG. 1 include a laptop computer and a personal digital assistant (PDA). Generally speaking, the user computing device 102 comprises any device, machine, or equipment that comprises the processing, memory, and input capabilities that allow a user to enter organization data into the computing device for storage therein.

The identification badge 104 comprises a relatively small, wearable, substantially card-shaped electrical device that, by way of example, has dimensions similar to a credit card. With this configuration, the identification badge 104 may be attached to one's clothing (or worn around the neck on an appropriate necklace) as with conventional identification badges. Example embodiments of the identification badge 104 are discussed in detail in the following.

As is further indicated in FIG. 1, the user computing device 102 and the identification badge 104 may communicate wirelessly. In some embodiments, such communication simply comprises transmission by the user computing device 102 and receipt by the identification badge 104 of organization data. Alternatively, communication may entail transmissions back and forth between the user computing device 102 and the identification badge 104. As is discussed below, these communications may be supported using an infrared (IR) or a radio frequency (RF) protocol.

Figure 2:
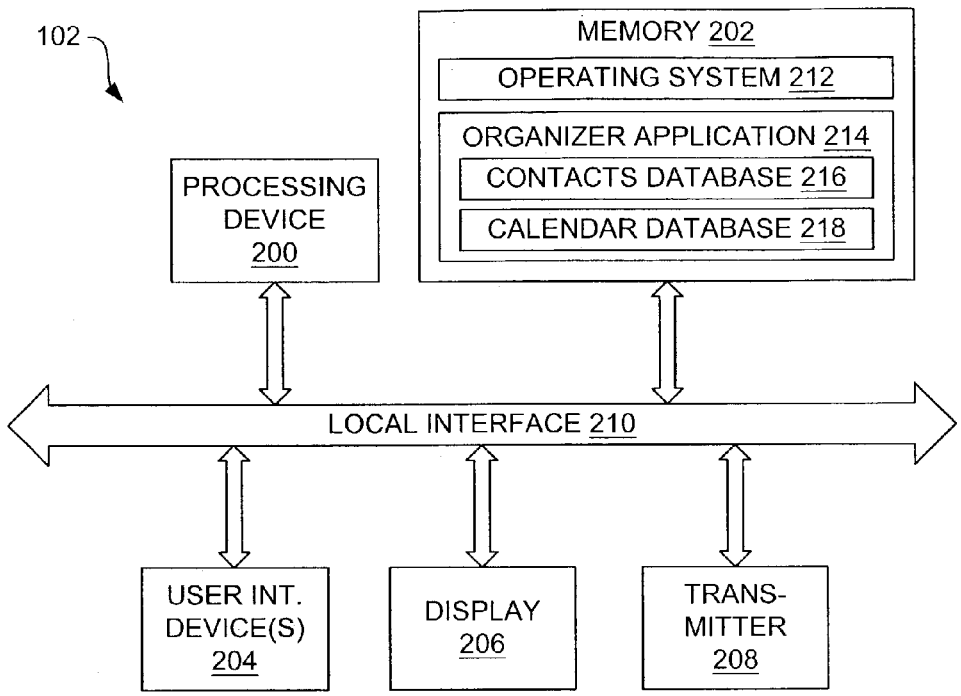
FIG. 2 is a block diagram of an example configuration of a user computing device shown in the system of FIG. 1.

FIG. 2 is a block diagram illustrating an example architecture for the user computing device 102 shown in FIG. 1. As indicated in FIG. 2, the computing device 102 can comprise a processing device 200, memory 202, user interface devices 204, a display 206, and a transmitter 208. Each of these components is connected to a local interface 210 that, by way of example, comprises one or more internal buses. The processing device 200 is adapted to execute commands stored in memory 202 and typically comprises a custom made or commercially available processor, a central processing unit (CPU) or an auxiliary processor among several processors associated with the computing device, a semiconductor based microprocessor (in the form of a microchip), or a macroprocessor. The memory 202 can comprise substantially any volatile or non-volatile memory, or combination thereof. Normally, however, the computing device 102 comprises both random access memory (RAM) and storage memory, typically in the form of one or more hard disks.

The user interface devices 204 comprise those components typically used with personal computing devices, such as a keyboard and a mouse. The display similarly comprises component typically used with a personal computing devices and therefore may comprise a cathode ray tube (CRT) or liquid crystal display (LCD) monitor. The transmitter 208 comprises a device that is capable of wirelessly transmitting data to another device, such as the identification badge 104. This transmitter 208 can therefore comprise an IR transmitter or an RF transmitter. In some embodiments, the transmitter 208 can further receive data so as to comprise a transceiver.

Although capable of storing other programs, the memory 202 typically at least includes an operating system 212 and an organizer application 214. The operating system 212 controls the execution of other programs and provides scheduling, input-output control, file and data management, memory management, and communication control and related services. The organizer application 214 comprises a program with which organization information such as contact information, calendar (i.e., appointment) information, task lists, and the like may be stored. As indicated in FIG. 2, the organizer application 214 may, therefore, at least include a contacts database 216 and a calendar database 218. An example of such an application is Microsoft Outlook™. As is described with specific reference to FIG. 11, the organizer application 214 is further configured to transmit organization data, including contacts and/or calendar data, to the identification badge 104 for the purpose of synchronizing the badge with the data stored by the organizer application.

Figure 3:
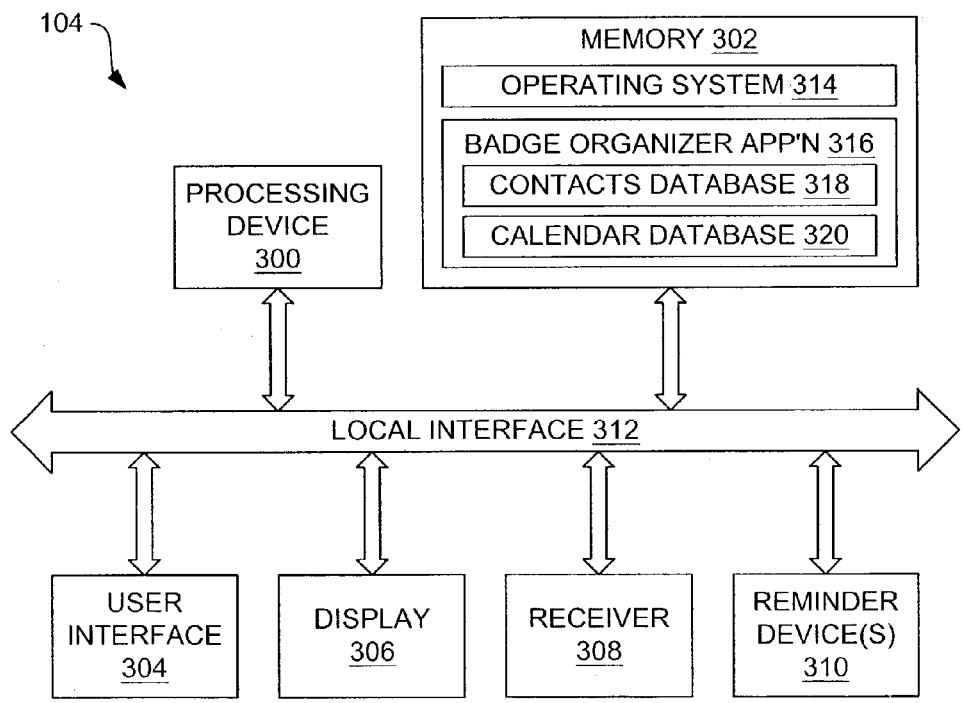
FIG. 3 is a block diagram of an example configuration of an identification badge shown in the system of FIG. 1.

FIG. 3 is a block diagram illustrating an example architecture for the identification badge 104 shown in FIG. 1. As indicated in FIG. 3, the identification badge 104 can be configured similar to the user computing device 102, albeit with lesser computing and storage capabilities. The identification badge 104 may therefore comprise a processing device 300, memory 302, a user interface 304, and a display 306, each of which is connected to a local interface 312.

The processing device 300 can; include any general-purpose processor, a microprocessor, one or more application-specific integrated circuits (ASICs), a plurality of suitably configured digital logic gates, and other well known electrical configurations comprised of discrete elements both individually and in various combinations to coordinate the overall operation of the identification badge 102. In a typical arrangement, the processing device 300 is packaged in an integrated circuit (IC) chip (see, e.g., FIG. 5). The memory 302 typically includes both volatile memory (e.g., RAM) and nonvolatile memory such as Flash memory, magnetic random access memory (MRAM), or atomic resolution storage (ARS) memory.

Figure 4:
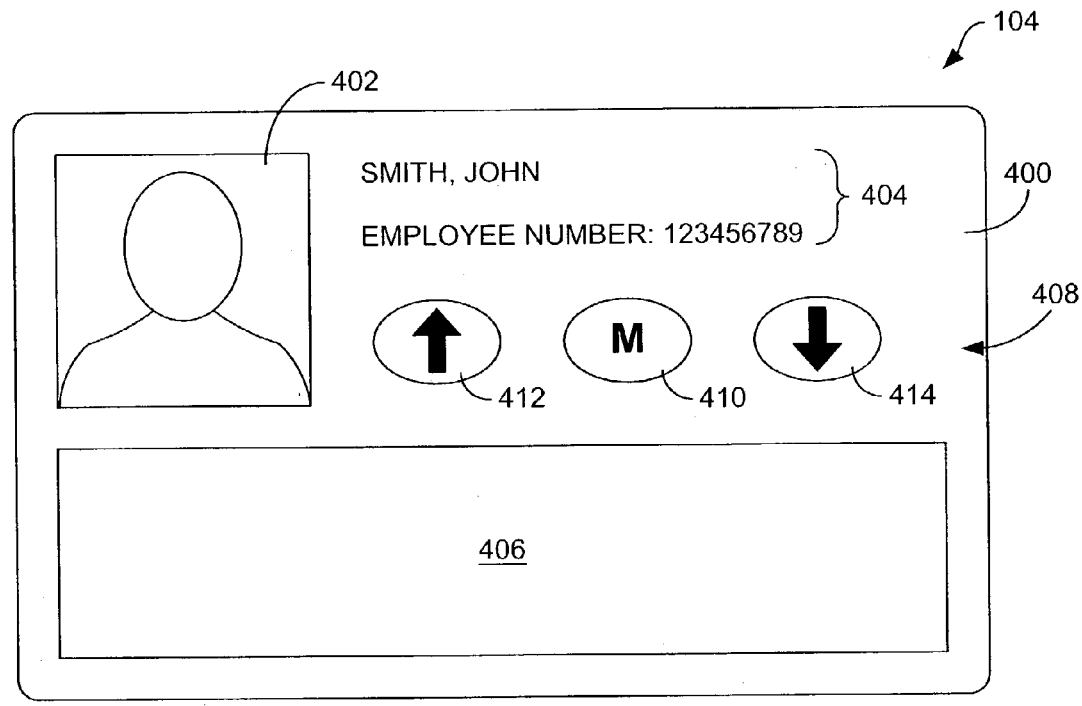
FIG. 4 is a schematic front view of an example embodiment of the identification badge shown in FIG. 3.
Figure 5:
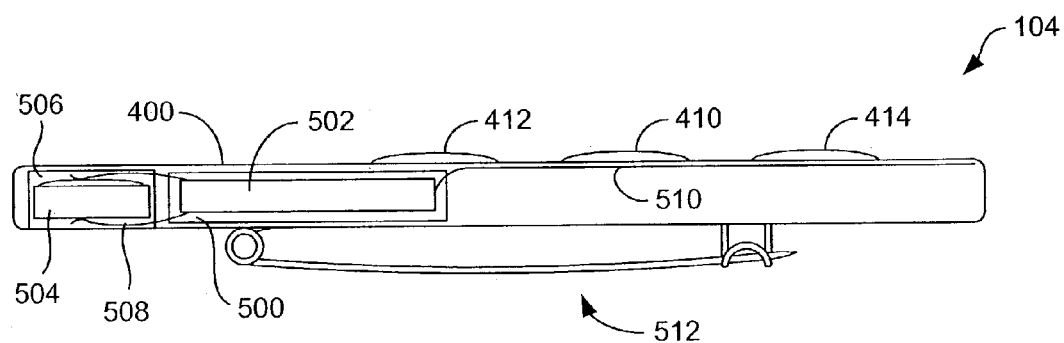
FIG. 5 is a schematic bottom view of the identification badge shown in FIG. 4.

The user interface 304 comprises components with which the user interacts with and controls the organizer functionality of the identification badge 104. By way of example, the interface 304 simply comprises buttons or keys with which the user can navigate one or more menus that contain or are associated with stored data. These data may be viewed with the display 306, which typically comprises an LCD screen. An example badge embodiment showing buttons and an LCD screen is illustrated in FIGS. 4 and 5.

As is further identified in FIG. 3, the badge 104 further comprises a receiver 308 that is configured to wirelessly receive data transmitted from the user computing device 102. In some embodiments, the receiver 308 can further transmit data or other information, in which case the receiver comprises a transceiver.

The identification badge 104 may further include one or more reminder devices 310 that are used to notify the user of a scheduled appointment or other event. The reminder device(s) can be configured to generate visual, audible, and/or vibratory alarms that can be set to activate at a desired time. In the case of a visual alarm, a light emitting diode (LED) can be activated to flash to signal the user. In the case of an audible alarm, an appropriate sound emitter (e.g., speaker) can be used. In the case of a vibratory alarm, a resonator may be used.

The memory 302 comprises various programs (in software and/or firmware) including a rudimentary operating system 314 that controls badge operation, and a badge organizer application 316 that is used to organize data received from the user computing device 102 or, optionally, entered by the user. The badge organizer application 316 is therefore configured to store contacts data in a contacts database 318, as well as store calendar data in a calendar database 320. With this information being stored in the identification badge 104, the user can use the badge to both look up contact information, review his or her schedule, receive reminders as to scheduled appointments, etc. Accordingly, the identification badge 104 can be used in similar manner as a PDA, but its functionality is wrapped in a package that is small enough to be integrated within the user's identification badge which, in many cases, is required to carried on the user's person while at the user's work site.

Various programs have been described herein. It is to be understood that these programs can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. The disclosed programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

FIGS. 4 and 5 illustrate an example physical embodiment of the identification badge 104. As indicated in FIG. 4, the front surface 400 of the identification badge 104 can include a photograph 402 of the user to which the badge belongs, as well as indicia 404 that identifies the user by name and/or employee number. Although a photograph 402 and user-related indicia 404 are shown and have been explicitly identified herein, these features are optional and have no effect on the organizer functionality of the identification badge 104.

The identification badge 104 typically includes a display which could be, for example, an LCD screen 406 and one or more keys or buttons 408. The LCD screen 406 is adapted to display information such as, for example, contacts and/or calendar data to the user. The screen 406 can, for instance, comprise a data light processing LCD screen manufactured using micro-electromechanical systems (MEMS) technology. The buttons 408 include, for example, a mode button 410, and up and down arrow buttons 412 and 414. The mode button 410 permits the user to select an operating mode of the identification badge 104. For instance, depression of the mode button 410 may switch information displayed in the LCD screen 406 from calendar information to contacts information or vice versa. In addition, the mode button 410 can be used to cancel any reminders (e.g., alarms) that are triggered upon the arrival of a scheduled time.

Once the desired mode of the identification badge 104 has been located using the mode button 410, the up and down arrow buttons 412 and 414 can be used to navigate through the information contained within the selected mode. For instance, if the contacts mode is selected, the up and down arrow buttons 412 and 414 may be used to scroll through an alphabetical list of stored contact information to locate a telephone number or address of a particular contact. Although specific buttons have been identified, it will be appreciated that additional and/or other buttons can be provided depending upon the desired functionality and device complexity/simplicity.

With reference to FIG. 5, illustrated is the bottom of the identification badge 104 as well as internal components of the badge. As shown in this figure, the badge 104 can define a first interior space 500 in which is disposed an IC chip 502 that comprises the processing device (i.e., controller) for the badge as well as all memory devices (volatile and nonvolatile). Although not indicated in FIG. 5, the IC chip 502 may be secured in place within the interior space 500 using an epoxy resin or other suitable wear. Electrically connected to the IC chip 502 is a power source in the form of a battery 504. As indicated in FIG. 5, the battery 504 may be provided in a second interior space 506, which facilitates insertion and removal of the battery so that dead batteries may be replaced with fresh ones. Electrical connection between the battery 504 and the IC chip 504 may be provided with electrical contacts 508. Extending from the IC chip 502 just below the front surface 400 of the identification badge 104 is an internal antenna 510 that is connected to a receiver (integrated into the IC chip) which facilitates receipt of organization data.

As is also indicated in FIG. 5, the identification badge 104 can further include a fastener 512, such as a pin (shown) or clip (not shown), which may be used to secure the badge to an article of clothing. With the provision of such a fastener 512, the user need not remember to take the identification badge 104 along with him or her. Instead, the badge 104 can always be carried on the user's person.

The non-volatile memory devices used within the IC chip 502 can take many different forms. For instance, Flash memory devices may be implemented. Due to space and power limitations, however, preferred are MRAM and ARS memory devices, both of which provide high density storage with relatively small power consumption.

Figure 6:
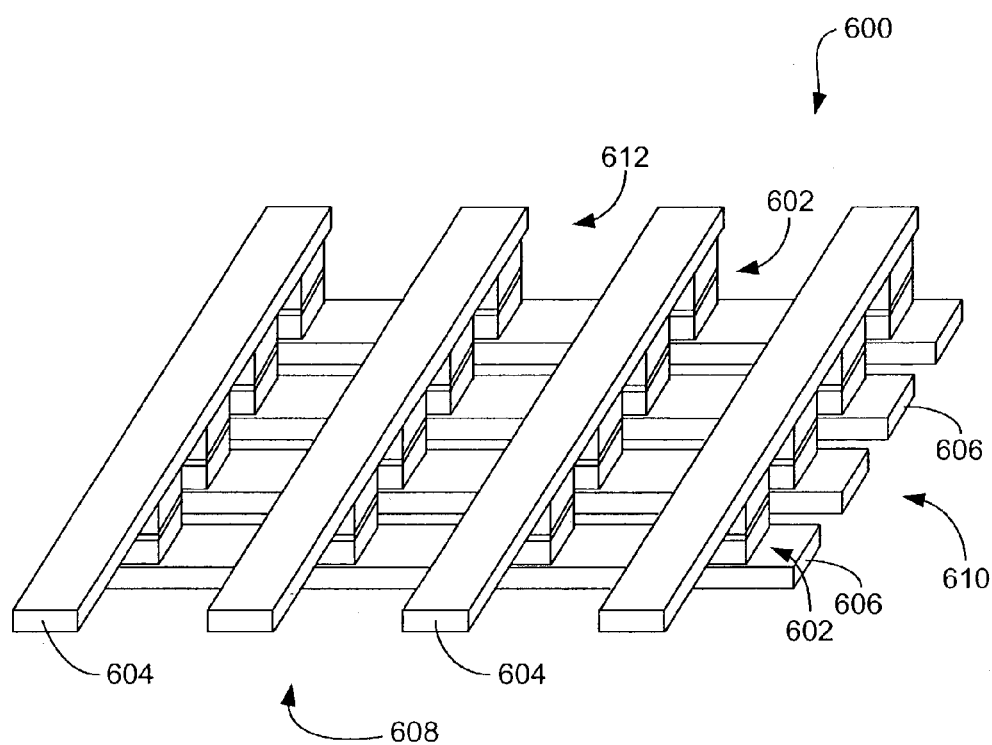
FIG. 6 is a schematic view illustrating the structure of a first example memory device that can be used in the identification badge shown in FIGS. 4 and 5.
Figure 7:
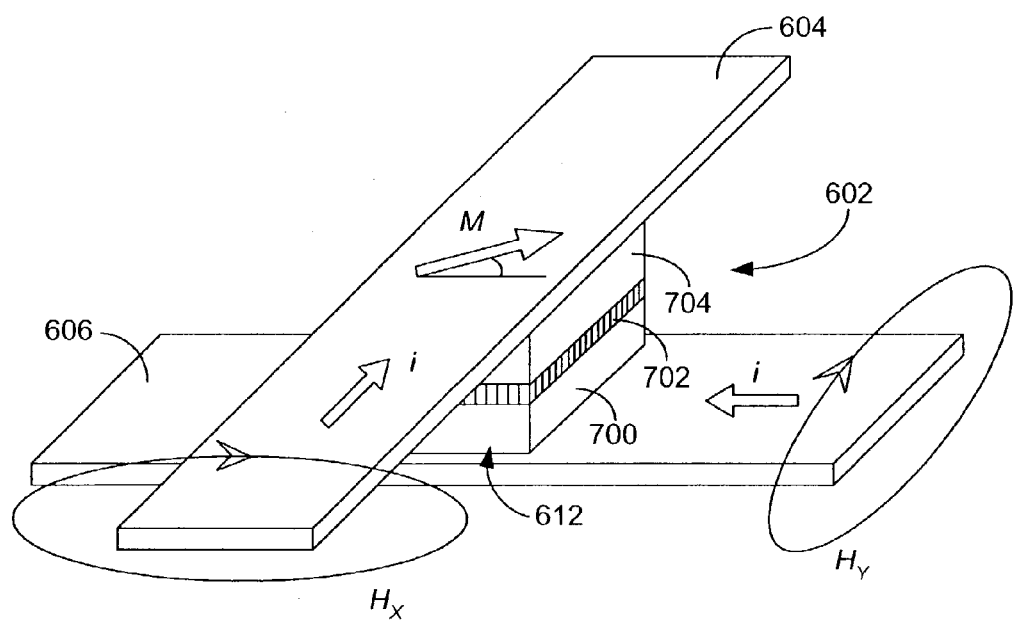
FIG. 7 is a schematic detail view of the memory device shown in FIG. 6.

FIGS. 6 and 7 illustrate an example memory device 600 using MRAM technology. The use of MRAM technology is particularly advantageous in terms of transfer rate performance in that MRAM devices can write, and read, data with great speed. As indicated in FIG. 6, the memory device 600 is a solid-state device that comprises a plurality of cells 602, which serve as magnetic domains, and a plurality of conductor bars 604 and 606. Typically, the bars 604, 606 are arranged in first and second parallel planes 608 and 610 with the bars of the first plane aligned substantially perpendicularly to the bars of the second plane. Because of this perpendicular arrangement, the bars 604, 606 form cross points 612. As is illustrated in FIG. 6, one cell 602 is normally disposed intermediate the two planes 608, 610 at each cross point 612 formed by the bars 604, 606. Therefore, as shown in the detail view of FIG. 7, each cell 602 is sandwiched between a first bar 604 and a second bar 606 at the two bars' cross point 612. As indicated in FIG. 7, each cell 602 normally comprises a pinned magnetic layer 700 (i.e., a layer which is permanently magnetized in a predetermined direction), a relatively thin dielectric layer 702, and a free magnetic sense layer 704 (i.e., a layer whose magnetization direction can be selectively changed). By way of example, the bars 604, 606 and their associated cells 602 can be formed on one or more substrates to create an integrated device.

In use, writing is accomplished by passing current, i, through the conductor bars 604, 606 to create magnetic fields $H_x$ and $H_y$. These magnetic fields produce resultant vector addition magnetic forces, M, at the crossover points 612 that are sufficient to selectively cause the magnetic orientation of the sense layers 704 to either coincide with the magnetic direction of the pinned magnetic layer 700 or to oppose it. Detection of the written state of the sense layer's magnetism can then be accomplished by determining the differential resistance in the tunneling magneto-resistive junction between the two conductor bars 604, 606 through the sense layer 704, the dielectric layer 702, and the pinned layer 700 depending upon the pinned layer's magnetic orientation.

Figure 8:
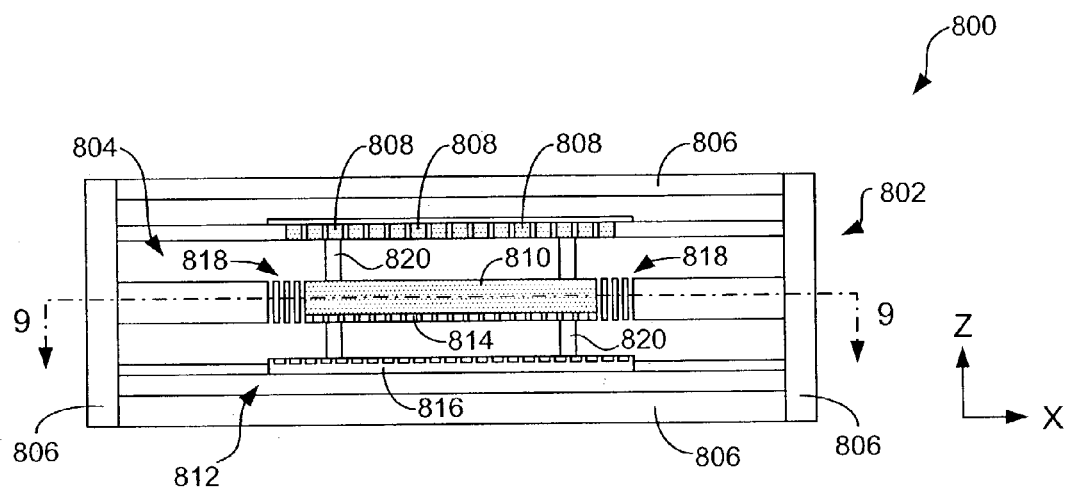
FIG. 8 is a schematic side view of the structure of a second example memory device that can be used in the identification badge shown in FIGS. 4 and 5.
Figure 9:
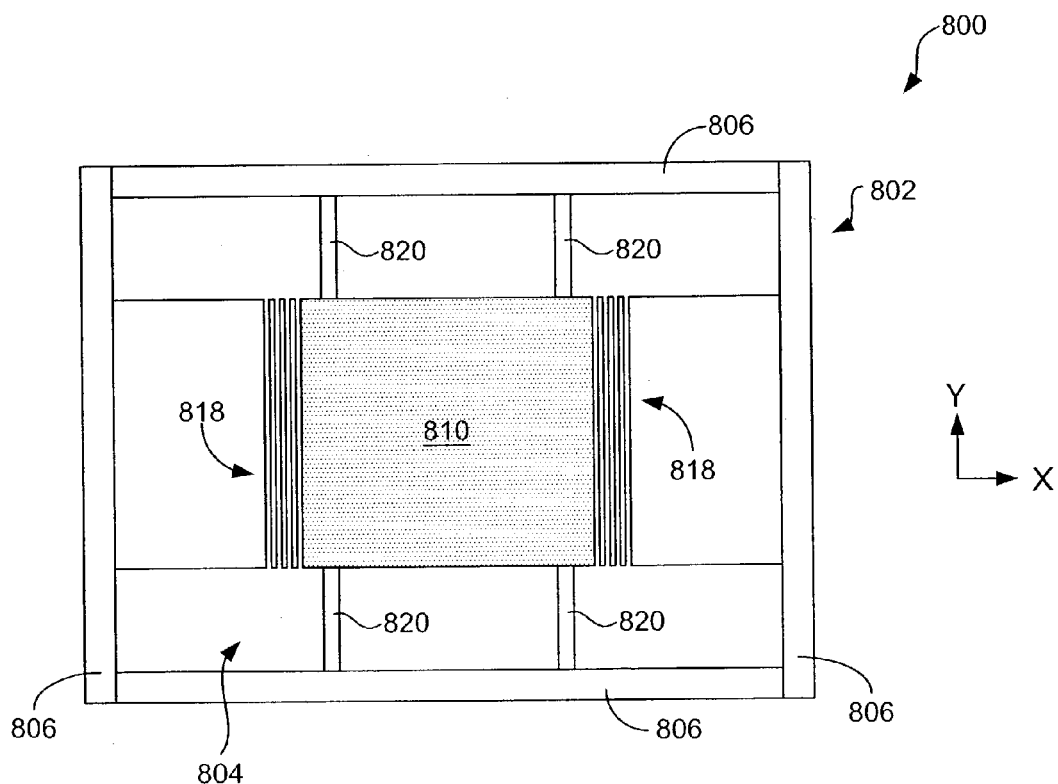
FIG. 9 is a schematic cross-sectional view of the memory device shown in FIG. 8 taken along line 9—9.
Figure 10:
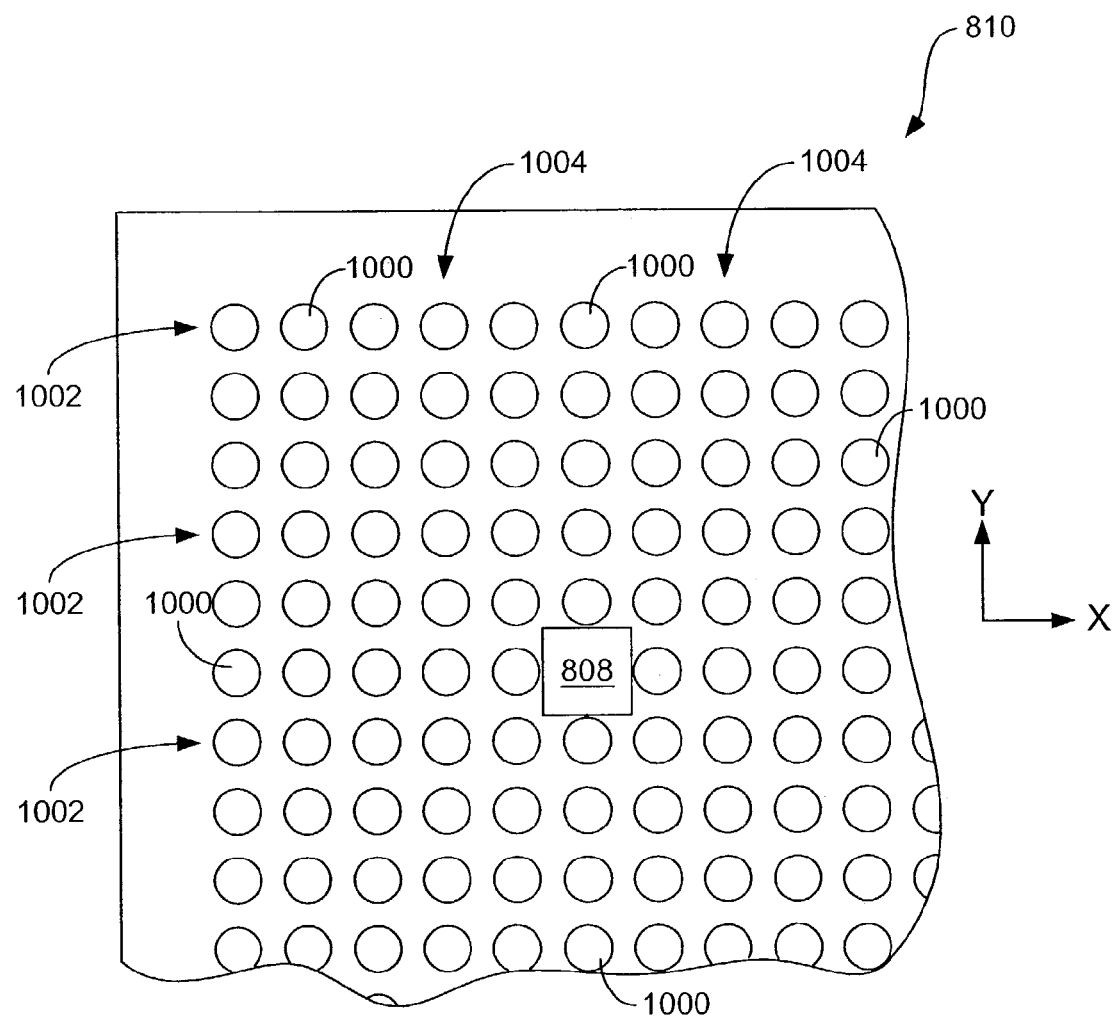
FIG. 10 is a partial schematic view of a storage medium of the memory device shown in FIGS. 8 and 9.

FIGS. 8–10 illustrate a second example memory device 800 using ARS technology. As indicated in FIGS. 8 and 9, the memory device 800 generally includes an outer casing 802 that forms an interior space 804 therein. By way of example, the casing 802 can include a plurality of walls 806 that define the interior space 804. Typically, the walls 806 of the casing 802 are sealed to each other such that a vacuum can be maintained within the interior space 804. Within the interior space 804 is a plurality of electron emitters 808 that face a storage medium 810. As described in relation to FIG. 10, the storage medium 810 comprises a plurality of storage areas (not visible in FIGS. 8 and 9). Each storage area of the storage medium 810 is responsible for storing one or more bits of data.

The electron emitters 808 are configured to emit electron beam currents toward the storage areas of the storage medium 810 when a predetermined potential difference is applied to the electron emitters. Depending upon the distance between the emitters 808 and the storage medium 810, the type of emitters, and the spot size (i.e., bit size) required, electron optics may be useful in focusing the electron beams. Voltage is also applied to the storage medium 810 to either accelerate or decelerate the emitted electrons and/or to aid in focusing the emitted electrons.

Each electron emitter 808 can serve many different storage areas to write data to and read data from the storage medium 810. To facilitate alignment between each electron emitter 808 and an associated storage area, the electron emitters and storage medium 810 can be moved relative to each other in the X and Y directions noted in FIG. 9. To provide for this relative movement, the memory device 800 can include a micromover 812 that scans the storage medium 810 with respect to the electron emitters 808. As indicated in FIGS. 8 and 9, the micromover 812 can include a rotor 814 connected to the storage medium 810, a stator 816 that faces the rotor, and one or more springs 818 that are positioned to the sides of the storage medium. As is known in the art, displacement of the rotor 814, and thereby the storage medium 810, can be effected by the application of appropriate potentials to electrodes of the stator 816 so as to create a field that displaces the rotor 814 in a desired manner. In an alternative arrangement, relative movement can be obtained by displacing the electron emitters or by displacing both the electron emitters and the storage medium.

The electron emitters 808 are responsible for reading and writing information on the storage areas of the storage medium with the electron beams they produce. Therefore, the electron emitters 808 preferably produce electron beams that are narrow enough to achieve the desired bit density for the storage medium 810, and that provide the different power densities needed for reading from and writing to the medium.

As indicated in FIGS. 8 and 9, the ARS device 800 can further include one or more supports 820 that support the storage medium 810 in place within the interior space 804. When provided, the supports 820 typically comprise thin-walled microfabricated beams that flex when the storage medium 810 is displaced in the X and/or Y directions. As is further indicated in FIGS. 8 and 9, the supports 820 can each be connected to the walls 806 of the casing 802.

The electron emitters 808 are contained within a two-dimensional array comprising a plurality of emitters. As discussed above, each emitter 808 typically is used to access a plurality of storage areas of the storage medium 810. FIG. 10 provides a schematic representation of this relationship. In particular, this figure illustrates a single electron emitter 808 positioned above a plurality of storage areas 1000 of the storage medium 810. As indicated in FIG. 10, the storage areas 1000, like the electron emitters 808, are contained in a two-dimensional array. In particular, the storage areas 1000 are arranged in separate rows 1002 and columns 1004 on the surface of the storage medium 810. Normally, each emitter 808 is only responsible for a portion of the entire length of predetermined numbers of rows 1002. Accordingly, each emitter 808 normally can access a matrix of storage areas 1000 of particular rows 1002 and columns 1004. Preferably, each row 1002 that is accessed by a single electron emitter 808 is connected to a single external circuit. Typically, each emitter 808 can access tens of thousands to hundreds of millions of storage areas 1000.

Writing with the memory device 800 is accomplished by temporarily increasing the power density of an electron beam produced by an electron emitter 808 to modify the surface state of a storage area 800 of the storage medium 810. For instance, the modified state can represent a "1" bit, while the unmodified state can represent a "0" bit. Moreover, the storage areas can be modified to different degrees to represent more than two bits, if desired. In one embodiment, the storage medium 810 is constructed of a material whose-structural state can be changed from crystalline to amorphous by electron beams. An example material is germanium telluride (GeTe) and ternary alloys based on GeTe. To change from the amorphous to the crystalline state, the beam power density can be increased and then slowly decreased. This increase/decrease heats the amorphous area and then slowly cools it so that the area has time to anneal into its crystalline state. To change from the crystalline to amorphous state, the beam power density is increased to a high level and then rapidly reduced.

Reading is accomplished by observing the effect of the electron beam on the storage area 1000, or the effect of the storage area on the electron beam. During reading, the power density of the electron beam is kept low enough so that no further writing occurs. In a first reading approach, reading is accomplished by collecting the secondary and/or backscattered electrons when an electron beam with a relatively low (i.e., lower than that needed to write) power density is applied to the storage medium 810. In that the amorphous state has a different secondary electron emission coefficient (SEEC) and backscattered electron coefficient (BEC) than the crystalline state, a different number of secondary and backscattered electrons are emitted from a storage area 1000 when bombarded with a read electron beam. By measuring the number of secondary and backscattered electrons, the state of the storage area 1000 can be determined. Example apparatus for reading and writing are described in U.S. Pat. No. 5,557,596, which is hereby incorporated by reference into the present disclosure.

An example identification badge 104 having been described in detail above, examples of use and operation of the badge will now be discussed. In the discussions that follow, flow diagrams are provided. Any process steps or blocks in these flow diagrams may represent modules, segments, or portions of code that include one or more executable instructions for implementing specific logical functions or steps in the process. Although particular example steps are described, alternative implementations are feasible. Moreover, steps may be executed out of order from that shown or discussed, including substantially concurrently or in reverse order, depending on the functionality involved.

Figure 11:
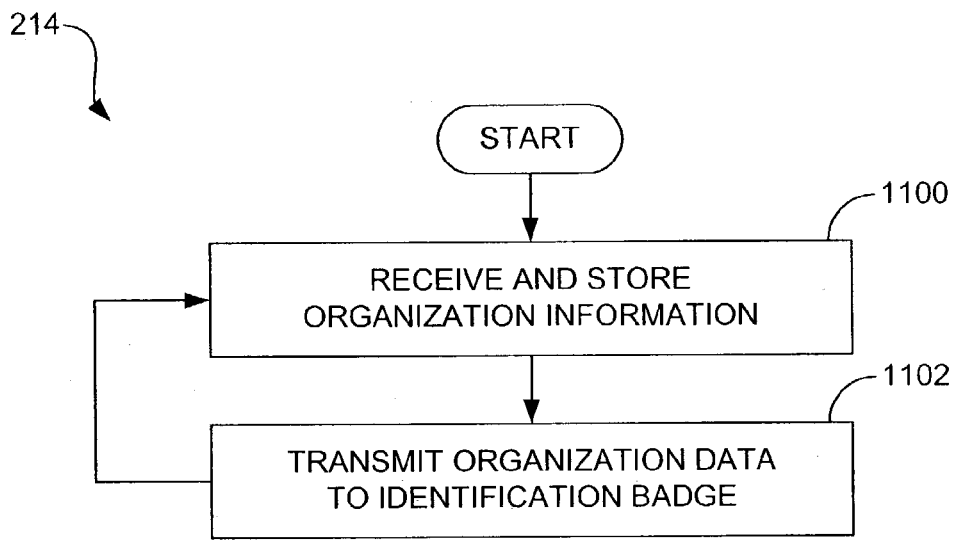
FIG. 11 is a flow diagram that illustrates an example of operation of an organizer application of the user computer shown in FIG. 2.

FIG. 11 provides an example of operation of the organizer application 214 of the user computing device 102. Beginning with block 1100 of this figure, the organizer application 214 receives and stores organization information. Reception of this information can be from the user who has input the information via the user interface devices 204, from another user via a network connection, or through some other method. In any event, contacts information may be stored in the contacts database 216 and calendar information may be stored in the calendar database 218.

At some point, organization data is transmitted (upon the initiation by the organizer application 214) to the identification badge 104, as indicated in block 1102. Initiation of the transmission can occur in response to satisfaction of a given condition. For example, in one embodiment, transmission can be initiated when a "synchronize" command is input by the user into the user compute device 102. In this scenario, synchronization of the identification badge 104 and the organizer application is manually initiated. Synchronization is facilitated in these cases due to the proximity of the identification badge 104, which is presumably being worn by the user, and the user computing device 102. As noted above, transmission may be via IR or RF communications. Of these two methods, RF is preferable from the standpoint that line-of-sight alignment of the identification badge 104 and the user computing device 102 is not necessary. By way of example, RF communications may be supported using any of wireless application protocol (WAP), ultrawideband (UWB) protocol, 802.11 protocol from the Institute of Electrical and Electronics Engineers (IEEE), or Bluetooth™ protocol from Bluetooth SIG™.

In another embodiment, the condition precedent for initiating data transmission comprises entry of new organization information into the organizer application 214 by the user or modification of existing organization information. In this case, synchronization of the identification badge 104 and the organizer application 214 is automatically initiated, thereby eliminating any manual intervention. As with the previous scenario, synchronization is facilitated in this case by the proximity of the user and, therefore, the badge 104 worn by the user.

In yet a further embodiment, data transmission may occur on a periodic basis. In such a case, the organizer application may transmit organization data every minute or so to the identification badge 104 to ensure that the data stored therein is up to date. Such periodic transmissions may only occur when proximity of the identification badge 104 is detected. Such detection can be achieved by sending a request for a reply (i.e., ping) to the identification badge 104 and only transmitting data when a reply is received from the badge, thereby signaling its proximity. In such a case, the badge 104 requires a component with which information can be transmitted back to the user computing device 102, such as a transceiver. Detection can, alternatively, be achieved by transmitting a signal to the identification badge 104 and detecting actuation of a passive component contained therein that is affected by the transmitted signal. Depending upon the RF protocol used, close proximity between the user and the user computing device 102 may not be necessary. For instance, in the case of 802.11 protocol, transmission may be received at distances up to, for example, 100 feet. Moreover, where multiple transmitters are used, each in communication with the organizer application 214 (e.g., through a wired connection) and positioned at various different locations within a given environment (e.g., the workplace), synchronization can be obtained even when the user is not near the user computing device 102, assuming such a transmitter is close enough to transmit data to the badge 104.

The organization data transmitted to the identification badge 104 may be limited due to the time that may be required to transmit all organization data stored by the organizer application 214 and/or the storage limitations of the identification badge. By way of example, the organizer application may be configured (e.g., via a user selectable mode) to only transmit new organization data, for instance that which was added in that calendar day. Alternatively, the organizer application 214 may be configured to only provide calendar data pertinent to that calendar day, e.g., the user's schedule for that day. It will be appreciated that many other arrangements are possible.

Once the data has been transmitted, flow may return to block 1100 and new organization information can be received, and further organization data transmitted to the identification badge 104.

Figure 12:
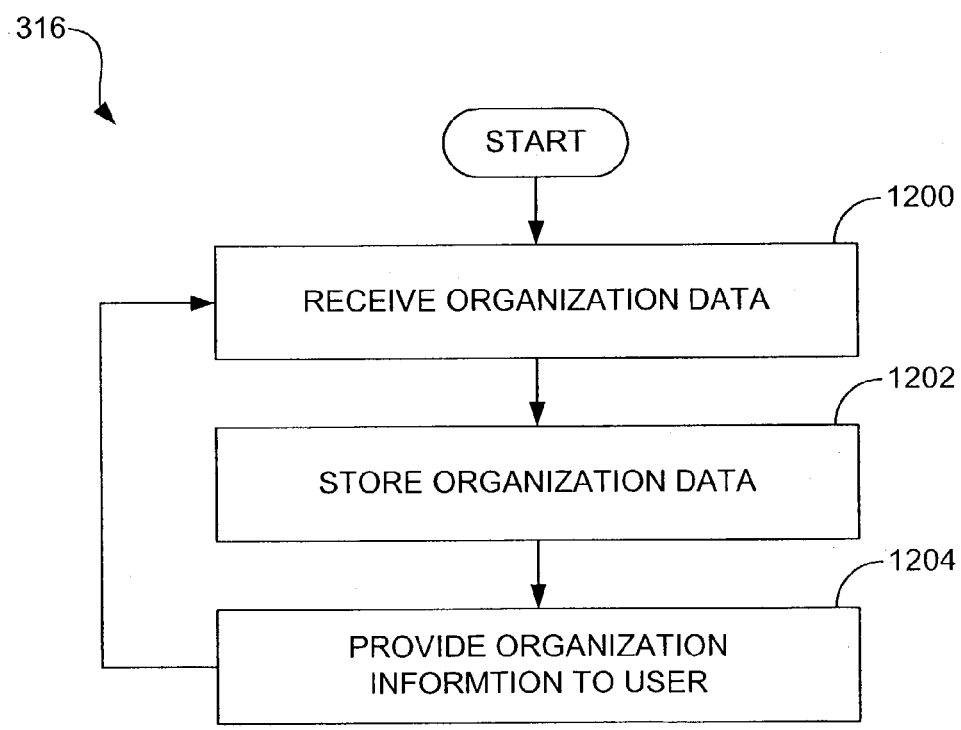
FIG. 12 is a flow diagram that illustrates an example of operation of a badge organizer application of the identification badge shown in FIG. 3.

FIG. 12 provides an example of operation of the badge organizer application 316 of the identification badge 104. Beginning with block 1200, organization data is wirelessly received from the organization application 214 of the user computing device 102. This data is stored, as indicated in 1202, in badge memory 302. For instance, contact data can be stored in the contacts database 318 and calendar data can be stored in the calendar database 320, both of which may be stored within non-volatile memory (e.g., Flash, MRAM, ARS) of the badge 104.

Next, as indicated in block 1204, the badge organizer application 316 can provide organization information to the user. The provision of this information can occur in a variety of different ways. For example, information may be provided in response to the user manipulating the buttons 408 provided on the identification badge 104. In this manner, the user can access any information stored by the identification badge 104 such as phone numbers, addresses, scheduled events, meetings, appointments, etc. In another situation, information may be provided as a reminder (e.g., alarm) that notifies the user as to the occurrence of some scheduled event. Such a reminder may be visual, audible, and/or vibratory in nature.

As is further indicated in FIG. 12, flow can return to block 1200 and new organization data received from the user computing device 102 such that the identification badge 104 is kept up to date.

What is claimed is:

1. A wearable electronic device for wearing by a user, the electronic device comprising:
   a wireless receiver that receives from the user's computer organization data comprising at least one of contacts data and schedule data stored in association with a first organizer program resident on the computer;
   a processing device;
   memory that stores the received organization data in association with a second organizer program, the second organizer program being configured to update previously stored data with the organization data received from the computer so as to synchronize the second organizer program with the first organizer program; and
   a display that displays organization information to the user;
   wherein the electronic device is substantially card-shaped.

2. The electronic device of claim 1, wherein the memory comprises non-volatile memory.

3. The electronic device of claim 2, wherein the non-volatile memory comprises at least one of Flash memory, magnetic random access memory (MRAM), and atomic resolution storage (ARS) memory.

4. The electronic device of claim 1, wherein the display comprises a liquid crystal display (LCD) provided on a front surface of the electronic device.

5. The electronic device of claim 1, further comprising a user interface including at least one button that is used to navigate organization information displayed in the display.

6. The electronic device of claim 1, wherein the electronic device has dimensions similar to a credit card.

7. The electronic device of claim 1, wherein the processing device, memory, and wireless receiver are integrated into a single component contained within the electronic device.

8. The electronic device of claim 7, wherein the single component comprises an integrated circuit (IC) chip.

9. The electronic device of claim 1, further comprising a battery that provides power to the processing device.

10. The device of claim 1, wherein the wireless receiver is a radio frequency (RF) receiver.

11. A wearable badge for wearing by a user, the badge comprising:
- a wireless receiver that is configured to wirelessly receive from the user's computer organization data comprising at least one of contacts data and schedule data stored in association with a first organizer program resident on the computer;
- a processing device;
- non-volatile memory that is configured to store the organization data in association with a second organizer program, the second organizer program being configured to update previously stored data with the organization data received from the computer so as to synchronize the second organizer program with the first organizer program;
- a liquid crystal display (LCD) provided on a front surface of the badge that is configured to display organization information associated with the organization data stored within the non-volatile memory; and
- a user interface including at least one button provided on the front surface of the badge, the at least one button being configured to facilitate navigation of the organization information displayed in the LCD;
- wherein the wearable badge has dimensions similar to those of a credit card.

12. The wearable badge of claim 11, wherein the non-volatile memory comprises at least one of Flash memory, magnetic random access memory (MRAM), and atomic resolution storage (ARS) memory.

13. The wearable badge of claim 11, wherein the processing device, non-volatile memory, and wireless receiver are integrated into an integrated circuit (IC) chip contained within the badge.

14. The wearable badge of claim 11, further comprising a battery that provides power to the processing device.

15. The wearable badge of claim 11, further comprising an internal antenna associated with the wireless receiver that facilitates receipt of wireless signals containing organization data.

16. The wearable badge of claim 11, further comprising a fastener configured to attach the badge to an article of clothing.

17. The badge of claim 11, wherein the wireless receiver is a radio frequency (RF) receiver.

18. The wearable badge of claim 11, wherein the badge further includes a photograph and printed indicia of the user on the badge front surface.

19. A system for providing organization information, comprising:
- a first organizer application configured for storage and execution on a user computing device, the first organizer application further configured to initiate wireless transmission of organization data; and
- a wearable badge including a processing device, a wireless receiver configured to wirelessly receive organization data transmitted from the user computing device, non-volatile memory configured to store received organization data in association with a second organizer program, the second organizer program being configured to update previously stored data with organization data received from the user computing device so as to synchronize the second organizer program with the first organizer program, and a display configured to display organization information that pertains to the stored organization data, wherein the badge is substantially card-shaped.

20. The system of claim 19, wherein the non-volatile memory comprises at least one of Flash memory, magnetic random access memory (MRAM), and atomic resolution storage (ARS) memory.

21. The system of claim 19, further comprising a badge organizer application stored within the non-volatile memory of the wearable badge.

22. The system of claim 19, wherein the wearable badge further comprises a user interface including at least one button that is used to navigate organization information displayed in the display.

23. The system of claim 19, wherein the processing device, non-volatile memory, and wireless receiver are integrated into an integrated circuit (IC) chip contained within the wearable badge.

24. The system of claim 19, wherein the wearable badge further comprises a battery that provides power to the processing device.

25. The system of claim 19, wherein the wireless receiver is a radio frequency (RF) receiver.

26. A method for providing organization information, comprising:
- receiving and storing organization information with a first organizer application resident on a user computer; and
- facilitating wireless transmission of organization data from the computer to a wearable badge adapted to receive, store, and display the organization data so as to synchronize a second organizer application resident on the wearable badge with the first organizer application resident on the user computer such that the first and second organizer applications comprise the same contacts and scheduling data.

27. The method of claim 26, wherein facilitating wireless transmission occurs in response to receipt of a command input by a user such that the second organizer application is synchronized with the first organizer application under the control of the user.

28. The method of claim 26, wherein facilitating wireless transmission occurs in response to the receiving and storing of organization information with the first organizer application such that the second organizer application is synchronized with the first organizer application when changes are made to the organization information associated with the first organizer application.

29. The method of claim 26, wherein facilitating wireless transmission occurs on a periodic basis such that the second organizer application is periodically synchronized with the first organizer application.

30. The method of claim 26, wherein facilitating wireless transmission comprises facilitating radio frequency (RF) transmission.

31. The method of claim 26, wherein facilitating wireless transmission automatically occurs in response to the user computer detecting proximity of the wearable badge such that the second organizer application is synchronized with the first organizer application when the badge is brought within proximity of the computer.

32. The method of claim 26, wherein facilitating wireless transmission of organization data from the computer to a wearable badge comprises facilitating wireless transmission of appointment data that will generate a reminder alarm for the badge user.

33. The method of claim 32, wherein the reminder alarm is one of a visual, audible, or vibratory alarm.

34. A method for providing organization information, comprising:

wirelessly receiving, using a wearable badge, organization data transmitted from a computing device and stored in relation to a first organizer application resident on the computing device;

updating organization data stored in relation to a second organizer application resident on the wearable badge such that the second organizer application is synchronized with the first organizer application using the received organization data; and displaying updated organization information in a display of the wearable badge.

35. The method of claim 34, further comprising changing the organization information displayed in the display in response to a selection made by a user via a user interface of the wearable badge.

36. The method of claim 34, wherein wirelessly receiving comprises receiving a radio frequency (RF) transmission.

* * * * *

UNITED STATES PATENT AND TRADEMARK OFFICE
CERTIFICATE OF CORRECTION

PATENT NO. : 7,103,379 B2  Page 1 of 1
APPLICATION NO. : 10/357234
DATED : September 5, 2006
INVENTOR(S) : Israel Omar Hilerio It is certified that error appears in the above-identified patent and that said Letters Patent is hereby corrected as shown below:

In column 5, line 2, delete "hot" and insert -- not --, therefor.

In column 12, line 8, in Claim 19, after "to" delete "the".

Signed and Sealed this

Thirty-first Day of March, 2009

JOHN DOLL
*Acting Director of the United States Patent and Trademark Office*